United States Patent
Cho (10) Patent No.: US 8,571,020 B2
(45) Date of Patent: Oct. 29, 2013

(54) SESSION INITIATION PROTOCOL (SIP) BASED VOICE OVER INTERNET PROTOCOL (VOIP) SYSTEM AND METHOD OF REGISTERING SIP TERMINAL THEREIN

(75) Inventor: Sung-Kwan Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1795 days.

(21) Appl. No.: 11/589,762

(22) Filed: Oct. 31, 2006

(65) Prior Publication Data

US 2007/0127447 A1 Jun. 7, 2007

(30) Foreign Application Priority Data

Nov. 9, 2005 (KR) .................. 10-2005-0107180

(51) Int. Cl.
*H04L 12/66* (2006.01)

(52) U.S. Cl.
USPC .......................................................... 370/356

(58) Field of Classification Search
None
See application file for complete search history.

(56) References Cited

U.S. PATENT DOCUMENTS

2002/0131402 A1* 9/2002 Lee et al. ....................... 370/352
2003/0229787 A1* 12/2003 Gabor ........................... 713/168
2004/0105433 A1* 6/2004 Seo ................................ 370/352
2006/0268829 A1 11/2006 Nedeltchev

FOREIGN PATENT DOCUMENTS

| GB | 2396073 | 6/2004 |
| KR | 10-0475186 | 3/2005 |

OTHER PUBLICATIONS

Combined Search and Examination Report corresponding to UK Patent Application No. GB0622051.1, issued on Jan. 29, 2007.
*Office action* from the Korean Intellectual Property Office issued in Applicant's corresponding Korean Patent Application No. 10-2005-0107180 dated Sep. 26, 2006.

* cited by examiner

*Primary Examiner* — John Blanton
(74) *Attorney, Agent, or Firm* — H.C. Park & Associates, PLC (57) ABSTRACT

A Session Initiation Protocol (SIP) based Voice over Internet Protocol (VoIP) system, upon receipt of a first registration request message from an SIP terminal, transmits a user information request message to the SIP terminal to request a Media Access Control (MAC) address of the SIP terminal, and upon receipt of a second registration request message including the MAC address from the SIP terminal, registers the SIP terminal and stores the MAC address to be matched to the registered SIP terminal, and then transmits a response message to the SIP terminal. The SIP based VoIP system improves a registration authentication process for the SIP terminal in the VoIP system using standard SIP so that the SIP server can effectively manage SIP terminals which are gradually increasing in number.

20 Claims, 9 Drawing Sheets

F1: REGISTER User A -> SIP Server

REGISTER sip:samsung.com SIP/2.0
    Via: SIP/2.0/UDP there.com:5060
    From: LittleGuy <sip:UserA@there.com>
    To: LittleGuy <sip:UserA@there.com>
    Call-ID: 123456789@there.com
    CSeq: 1 REGISTER
    Contact: <sip:UserA@110.111.112.113>
    Contact: <sip:+1-972-555-2222@gw1.wcom.com;user=phone>
    Contact: tel:+1-972-555-2222
    Content-Length: 0

FIG. 8B

F2: 401 Unauthorized SIP Server -> User A

SIP/2.0 401 Unauthorized
    Via: SIP/2.0/UDP there.com:5060
    From: LittleGuy <sip:UserA@there.com>
    To: LittleGuy <sip:UserA@there.com>
    Call-ID: 123456789@there.com
    CSeq: 1 REGISTER
    WWW-Authenticate: Digest realm="Samsung OfficeServ SIP",
        domain="sip:samsung.com", nonce="mac-c8e88df84f1cec4341ae6cbe5a35",
        opaque="", stale=FALSE, algorithm=MD5
    Content-Length: 0

FIG. 8C

```
F3: REGISTER User A -> SIP Server

REGISTER sip:samsung.com SIP/2.0
   Via: SIP/2.0/UDP there.com:5060
   From: LittleGuy <sip:UserA@there.com>
   To: LittleGuy <sip:UserA@there.com>
   Call-ID: 123456789@there.com
   CSeq: 2 REGISTER
   Contact: <sip:UserA@110.111.112.113>
   Contact: <sip:+1-972-555-2222@gw1.wcom.com;user=phone>
   Contact: tel:+1-972-555-2222
   Authorization:Digest username="UserA000447681cdd",
     realm="Samsung OfficeServ SIP",
     nonce="mac-c8e88df84f1cec4341ae6cbe5a35", opaque="",
     uri="sip:samsung.com", response="dfe56131d1958046689cd83306477ecc"
   Content-Length: 0
```

FIG. 8D

```
F4: 200 OK SIP Server -> User A

SIP/2.0 200 OK
   Via: SIP/2.0/UDP there.com:5060
   From: LittleGuy <sip:UserA@there.com>
   To: LittleGuy <sip:UserA@there.com>
   Call-ID: 123456789@there.com
   CSeq: 2 REGISTER
   Contact: <sip:UserA@110.111.112.113>;expires=3600
   Contact: <sip:+1-972-555-2222@gw1.wcom.com;user=phone>;expires=3600
   Contact: <tel:+1-972-555-2222>;expires=4294967295
   Content-Length: 0
```

SESSION INITIATION PROTOCOL (SIP) BASED VOICE OVER INTERNET PROTOCOL (VOIP) SYSTEM AND METHOD OF REGISTERING SIP TERMINAL THEREIN

CLAIM OF PRIORITY

This application makes reference to, incorporates the same herein, and claims all benefits accruing under 35 U.S.C. §19 from an application for VOICE ONLY IP SYSTEM FOR USING SESSION INITIATION PROTOCOL AND SESSION INITIATION PROTOCOL TERMINAL REGISTER METHOD OF THEREOF earlier filed in the Korean Intellectual Property Office of Nov. 9, 2005 and there duly assigned Serial No. 10-2005-0107180.

BACKGROUND OF THE INVENTION

1. Field of the Invention

The present invention relates to a Session Initiation Protocol (SIP) based Voice over Internet Protocol (VoIP) system and a method of registering an SIP terminal therein.

2. Description of the Related Art

The SIP is a type of signal protocol designed for establishing/terminating sessions in an Internet Protocol (IP) network. It is well known as a VoIP telephone standard to locate and connect terminal users to a multi-group voice and video conference. Like the HyperText Transfer Protocol (HTTP), the SIP is versatile and convenient to use. The Internet Engineering Task Force (IETF) published RFC 2543 as the first version of the SIP in 1999, and more recently published RFC 3261 as the latest version of the SIP in June 2002.

While the SIP can adopt a User Datagram Protocol (UDP) or a Transmission Control Protocol (TCP) as a transfer means, it generally uses UDP in port 5060 as a reference value. When an SIP packet is lost owing to an unreliable protocol such as UDP, the SIP determines whether or not it has waited for a response for a sufficient time period, and then retransmits a command.

An SIP terminal generally uses a command "REGISTER" to be registered in a server. The SIP terminal transmits the "REGISTER" command to an SIP call server in order to register itself in the SIP call server.

Then, the SIP call server transmits a "401 Unauthorized" message to the SIP terminal. The "401 Unauthorized" message is a message requesting, for example, a user ID, password, nonce and domain of a "WWW-Authenticate" field.

A nonce is a parameter that varies with time. A nonce can be a time stamp, a visit counter on a Web page, or a special marker intended to limit or prevent the unauthorized replay or reproduction of a file. Because a nonce changes with time, it is easy to tell whether or not an attempt at replay or reproduction of a file is legitimate. That is, the current time can be compared with the nonce. If it does not exceed it or if no nonce exists, then the attempt is authorized. Otherwise, the attempt is not authorized.

Upon having received the "401 Unauthorized" message from the SIP call server, the SIP terminal transmits a user ID, password, nonce, domain and the like on a second "REGISTER" message to the SIP call server.

Then, the SIP call server performs an authentication in an MD5 mode to register the SIP terminal. That is, the SIP call server performs a registration through the user ID, password, nonce and domain of the SIP terminal from the "REGISTER" message transmitted from the SIP terminal as a method of registering the SIP terminal in a VoIP system based on the SIP (see RFC 3261).

Then, the SIP call server transmits a "200 OK" response message to the SIP terminal, completing the registration of the SIP terminal.

The use of a proxy server requires a register server. For example, when a telecommunication worker makes a connection to a VoIP telephone, the telephone sends a counterpart location to the register server. Several telephones can be registered by a single register server if there is an SIP gateway available in case of calling.

However, a conventional registration of a terminal in an SIP based VoIP system has drawbacks. That is, at self-initialization and thus re-registration of a previously registered terminal, if its authentication key is not identical, a new authentication key must be inconveniently generated again for re-registration.

Furthermore, when the IP of the terminal is changed, it is difficult to identify the terminal in case of a registration request and thus, registration errors can occur.

SUMMARY OF THE INVENTION

It is therefore an object of the present invention to provide a Session Initiation Protocol (SIP) based Voice over Internet Protocol (VoIP) system and a method of registering an SIP terminal therein, which can simplify and strengthen an authentication process by utilizing a Media Access Control (MAC) address when registering a terminal in the system.

According to one aspect of the present invention, a Session Initiation Protocol (SIP) based Voice over Internet Protocol (VoIP) system is provided, the system including: an SIP call server and an SIP terminal; the SIP call server adapted to transmit a user information request message to the SIP terminal to request a Media Access Control (MAC) address of the SIP terminal upon receipt of a first registration request message from the SIP terminal and to register the SIP terminal and store the MAC address to be matched to the registered SIP terminal upon receipt of a second registration request message including the MAC address from the SIP terminal, and to transmit a response message to the SIP terminal; and the SIP terminal adapted to analyze the user information request message to determine whether or not to request the MAC address upon receipt of the user information request message after transmission of the first registration request message, and to transmit the MAC address thereof on the second registration request message to the SIP call server.

The second registration request message is preferably adapted to add the MAC address thereof to a user_name of an "Authorization" field.

The user information request message preferably includes an identifier in a nonce of a "WWW-Authenticate" field.

According to another aspect of the present invention, a Session Initiation Protocol (SIP) terminal of an SIP based Voice over Internet Protocol (VoIP) system is provided, the terminal including an SIP registration module adapted to transmit a first registration request message to an SIP call server upon receipt of a user information request message that requests a Media Access Control (MAC) address of an SIP terminal, to transmit a second registration request message including the MAC address of the SIP terminal to the SIP call server, and to receive a response message therefrom to complete SIP terminal registration.

The SIP registration module preferably includes: an SIP message processor adapted to transmit the first and second registration request messages to the SIP call server and to receive the user information request message and the response message from the SIP call server; an identifier discriminator adapted to determine whether or not the user information request message received from the SIP call server has the MAC address of the SIP terminal; and a MAC address input unit adapted to add the MAC address of the SIP terminal to the second registration request message upon an identifier existing in the user information request message.

The second registration request message preferably includes the MAC address of the SIP terminal in a user_name of an "Authorization" field.

The user information request message preferably includes an identifier in a nonce of a "WWW-Authenticate" field.

According to still another aspect of the present invention, a Session Initiation Protocol (SIP) call server of an SIP based Voice over Internet Protocol (VoIP) system is provided, the server including an SIP registration module adapted to transmit a user information request message to an SIP terminal to request a Media Access Control (MAC) address of the SIP terminal upon receipt of a first registration message from the SIP terminal, to register the SIP terminal while storing the MAC address to be matched to the registered SIP terminal upon receipt of a second registration message from the SIP terminal including the MAC address of the SIP terminal, and to transmit a response message to the SIP terminal.

The SIP registration module preferably includes: an SIP message processor adapted to transmit the user information request message to the SIP terminal upon receipt of the first registration message from the SIP terminal, to extract user information and the MAC address of the SIP terminal upon receipt of the second registration message from the SIP terminal including the MAC address, and to transmit the response message to the SIP terminal upon the SIP terminal being authenticated; an SIP register adapted to register the SIP terminal based on the user information of the SIP terminal extracted from the SIP message processor; and a MAC memory adapted to store the MAC address to be matched to an authentication key of the SIP terminal upon authentication of the SIP terminal by the SIP register.

The second registration request message preferably includes the MAC address of the SIP terminal in a user_name of an "Authorization" field.

The user information request message preferably includes an identifier in a nonce of a "WWW-Authenticate" field.

According to yet another aspect of the present invention, a method of registering a Session Initiation Protocol (SIP) terminal in an SIP based Voice over Internet protocol (VoIP) system is provided, the method including: transmitting a first registration request message to an SIP call server from the SIP terminal; transmitting a user information request message to the SIP terminal from the SIP call server, requesting a Media Access Control (MAC) address of the SIP terminal; transmitting a second registration request message including the MAC address thereof to the SIP call server from the SIP terminal; and registering the SIP terminal based on the second registration request message and storing the MAC address to be matched to the registered SIP terminal in the SIP call server, and transmitting a response message to the SIP terminal.

The user information request message transmitted from the SIP call server to the SIP terminal preferably includes an identifier in a nonce of a "WWW-Authenticate" field in order to acquire the MAC address of the SIP terminal.

The second registration request message transmitted from the SIP terminal to the SIP call server preferably includes the MAC address of the SIP terminal in a user_name of an "Authorization" field.

According to a further aspect of the present invention, a method of registering a Session Initiation Protocol (SIP) terminal in an SIP based Voice over Internet protocol (VoIP) system is provided, the method including: transmitting a first registration request message to an SIP call server and receiving a user information request message therefrom; determining whether or not the SIP call server has requested a Media Access Control (MAC) address of the SIP terminal based on the user information request message received therefrom; transmitting user terminal information including the MAC address of the SIP terminal on a second registration request message to the SIP call server upon a determination that the SIP call server has requested the MAC address of the SIP terminal; and receiving a response message from the SIP call server to complete registration.

The method preferably further includes: transmitting user terminal information without the MAC address of the SIP terminal on the second registration request message to the SIP call server upon a determination that the SIP call server has not requested the MAC address of the SIP terminal; and receiving a response message from the SIP call server to complete registration.

Determining whether or not the SIP call server has requested a MAC address of the SIP terminal preferably includes determining whether or not an identifier is included in a nonce of a WWW-Authenticate field in the received user information request message.

Transmitting user terminal information preferably includes adding the MAC address of the SIP terminal to a user_name of an "Authorization" field.

According to yet another aspect of the present invention, a method of registering a Session Initiation Protocol (SIP) terminal by an SIP call server in an SIP based Voice over Internet Protocol (VoIP) system is provided, the method including: receiving a first registration request message from the SIP terminal; transmitting a user information request message to the SIP terminal, requesting a Media Access Control (MAC) address of the SIP terminal; and registering the SIP terminal based on a second registration request message received from the SIP terminal and storing the MAC address to be matched to the registered SIP terminal, and transmitting a response message to the SIP terminal.

Transmitting a response message to the SIP terminal preferably includes: determining whether or not the MAC address of the SIP terminal is included in the second registration request message received from the SIP terminal; determining whether or not the registered SIP terminal exists based on the MAC address upon the MAC address of the SIP terminal being included in the second registration request message; and transmitting the response message to the SIP terminal upon a determination that the registered SIP terminal has been confirmed as existing.

The method preferably further includes registering the SIP terminal without storing the MAC address of the SIP terminal upon a determination that the MAC address has not been included in the second registration request message, and transmitting the response message to the SIP terminal.

The method preferably further includes conducting registration by matching of the MAC address of the SIP terminal upon a determination that the registered SIP terminal does not exist, and transmitting the response message to the SIP terminal.

Transmitting the user information request message to the SIP terminal preferably includes adding an identifier to a nonce of a "WWW-Authenticate" field in the user information request message and transmitting the user information request message in order to acquire the MAC address of the SIP terminal.

The method preferably further includes confirming the MAC address of the SIP terminal by comparing a user_name of an "Authorization" field of the first registration request message with that of the second registration request message.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention are described in detail with reference to the accompanying drawings. Like elements are denoted by like reference numerals throughout the drawings. Matters related to the present invention and well-known in the art have not been described in detail when deemed that such descriptions would detract from the clarity and conciseness of the disclosure.

Figure 1:
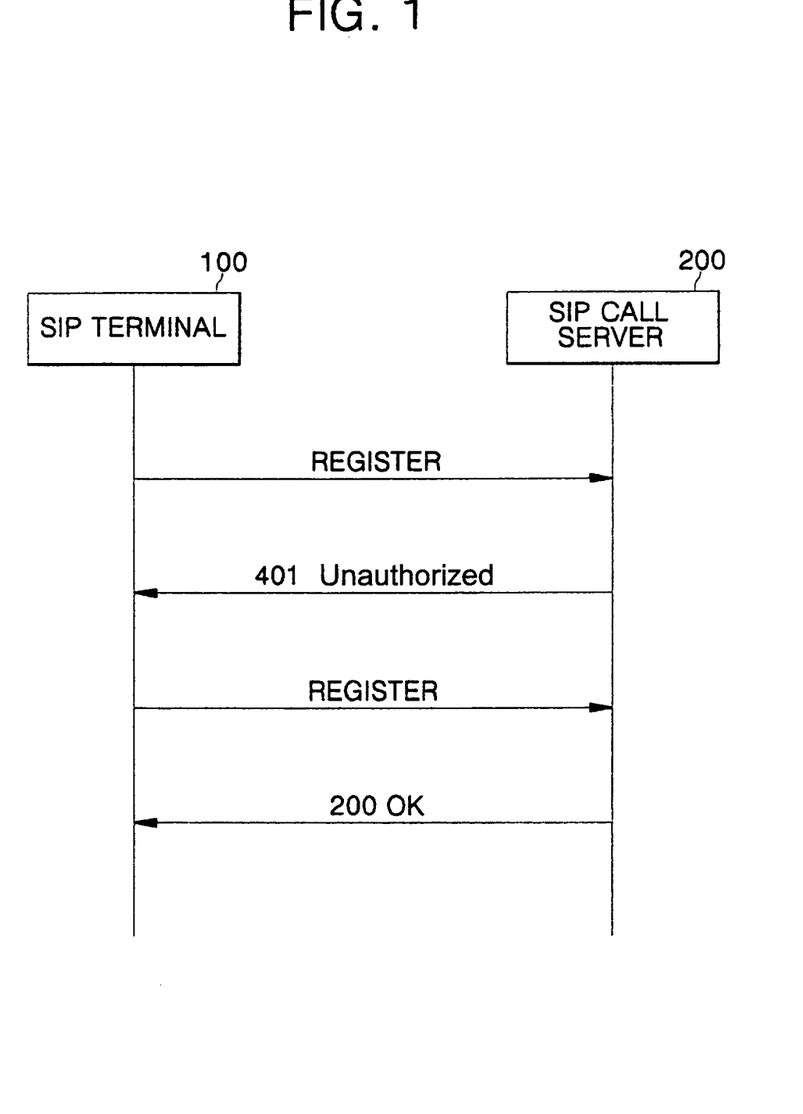
FIG. 1 is a functional block diagram of a Session Initiation Protocol (SIP) based Voice over Internet Protocol (VoIP) system according to an embodiment of the present invention.

FIG. 1 is a functional block diagram of a Session Initiation Protocol (SIP) based Voice over Internet Protocol (VoIP) system according to an embodiment of the present invention, in which the VoIP system includes an SIP terminal 100 and an SIP call server 200.

The SIP terminal 100 receives a user information request message after having transmitted a first registration request message to the SIP call server 200. Then, the SIP terminal 100 analyzes the user information request message, determines whether or not a Media Access Control (MAC) address has been requested, and if the MAC address has been requested, transmits the MAC address on a second registration request message to the SIP call server 200. Upon receiving a response message from the SIP call server 200, the SIP terminal 100 terminates a registration process. The second registration request message transmitted from the SIP terminal 100 includes the MAC address of the SIP terminal 100 in the user_name of the "Authorization" field.

When the SIP call server 200 receives the first registration message from the SIP terminal 100, it transmits the user information request message to the SIP terminal 100, requesting the MAC address of the SIP terminal 100. If the second registration message including the MAC address has been received from the SIP terminal 100, the SIP call server 200 registers the SIP terminal 100 while storing the MAC address to be matched to the registered SIP terminal 100. Then, the SIP call server 200 transmits the response message to the SIP terminal 100. In this case, the user information request message transmitted from the SIP call server 200 includes an identifier in the nonce of the "WWW-Authenticate" field.

The SIP call server 200, upon receiving the second registration request message from the SIP terminal 100, determines whether or not the MAC address is present in the second registration request message. If the MAC address is present, the SIP call server 200 authenticates the SIP terminal 100 via MD5 mode while registering the MAC address to be matched to the registered SIP terminal 100.

If the MAC address is absent in the second registration request message, the SIP call server 200 authenticates and registers the SIP terminal 100 by the MD5 mode.

Figure 8A:
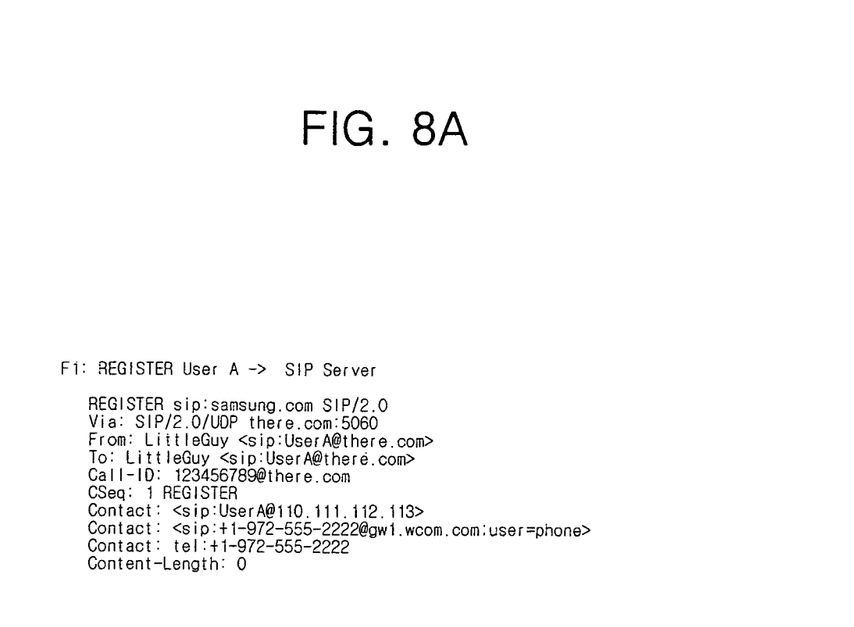
FIG. 8A is a first registration request message that the SIP terminal transmits to the SIP call server in the SIP based VoIP system of any one of FIGS. 1 to 7.

First, the SIP terminal 100 transmits a first registration request message, as shown in FIG. 8A, to the SIP call server 200.

Then, the SIP call server 200 transmits a user information request message to the SIP terminal 100, requesting the MAC address of the SIP terminal 100. In this case, the user information request message transmitted from the SIP call server 200 further includes an identifier in the nonce of the "WWW-Authenticate" field.

Then, the SIP terminal 100 analyzes the user information request message to determine whether or not the MAC address has been requested, and if the MAC address has been requested, transmits its own MAC address on a second registration request message to the SIP call server 200. In this case, the second registration request message transmitted from the SIP terminal 100 includes its own MAC address in the user_name of the "Authorization" field.

Then, the SIP call server 200 determines whether or not the MAC address of the SIP terminal 100 has been included in the second registration request message. If the MAC address of the SIP terminal 100 has been included, the SIP call server 200 registers the SIP terminal 100 while storing the MAC address to be matched to the registered terminal.

After that, the SIP call server 200 transmits a response message to the SIP terminal 100.

The SIP terminal 100 completes the registration process after receiving the response message from the SIP call server 200.

Figure 2:
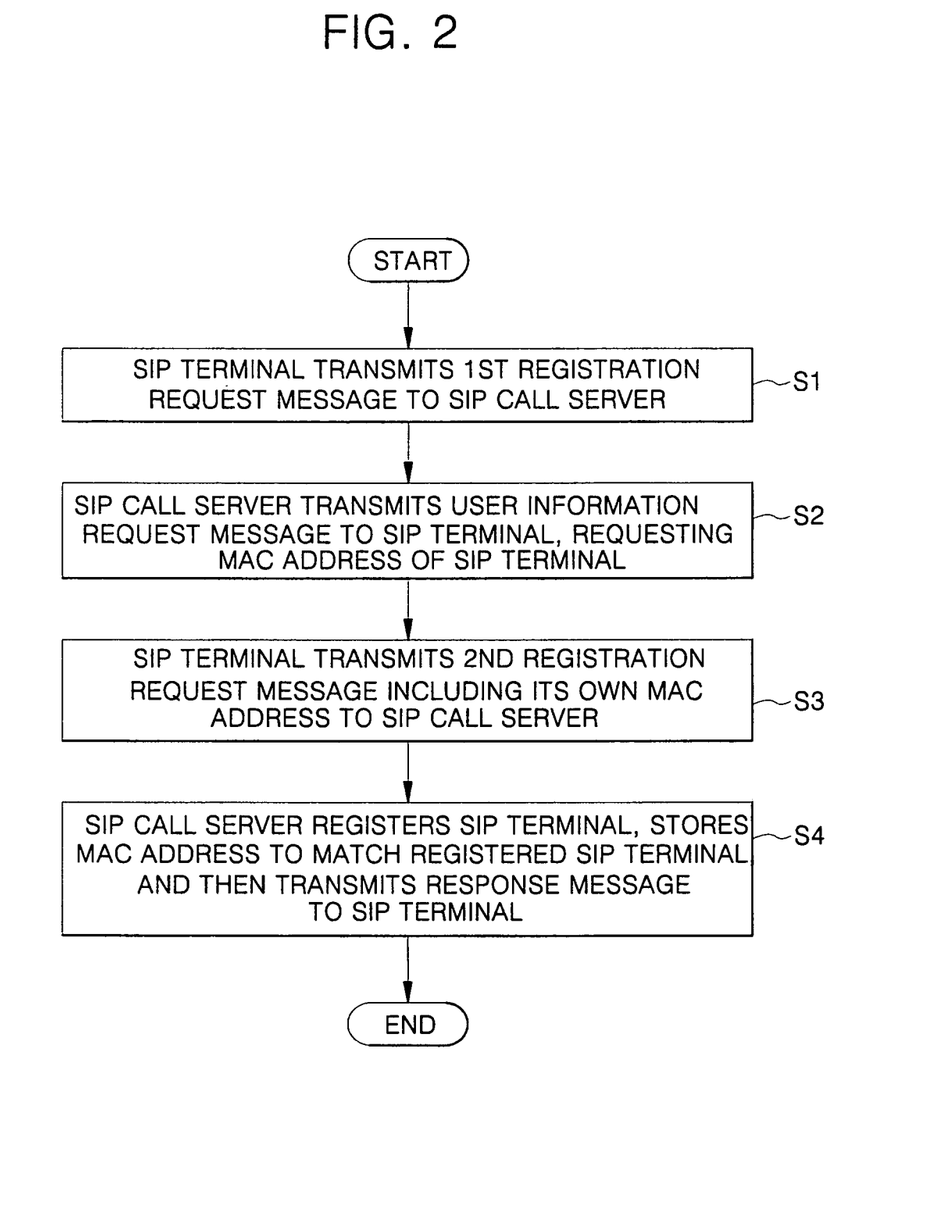
FIG. 2 is a flowchart of a method of registering an SIP terminal in an SIP based VoIP system according to an embodiment of the present invention.

A method of registering an SIP terminal of an SIP based VoIP system having the above-described construction according to an embodiment of the present invention is described below with reference to FIG. 2.

In S1, the SIP terminal 100 transmits a first registration request message to the SIP call server 200.

Then, the SIP call server 200 transmits a user information request message to the SIP terminal 100, requesting the MAC address of the SIP terminal 100 in S2. The user information request message transmitted from the SIP call server 200 to the SIP terminal 100 includes an identifier in the nonce of the "WWW-Authenticate" field.

In S3, the SIP terminal 100 transmits a second request message including its own MAC address to the SIP call server 200. The second registration request message transmitted from the SIP terminal 100 to the SIP call server 200 includes the MAC address of the SIP terminal 100 in the user_name of the "Authenticate" field.

Next, the SIP call server 200 registers the SIP terminal 100 based on the second registration request message while storing the MAC address to be matched to the registered SIP terminal 100, and then transmits a response to the SIP terminal 100 in S4.

Figure 3:
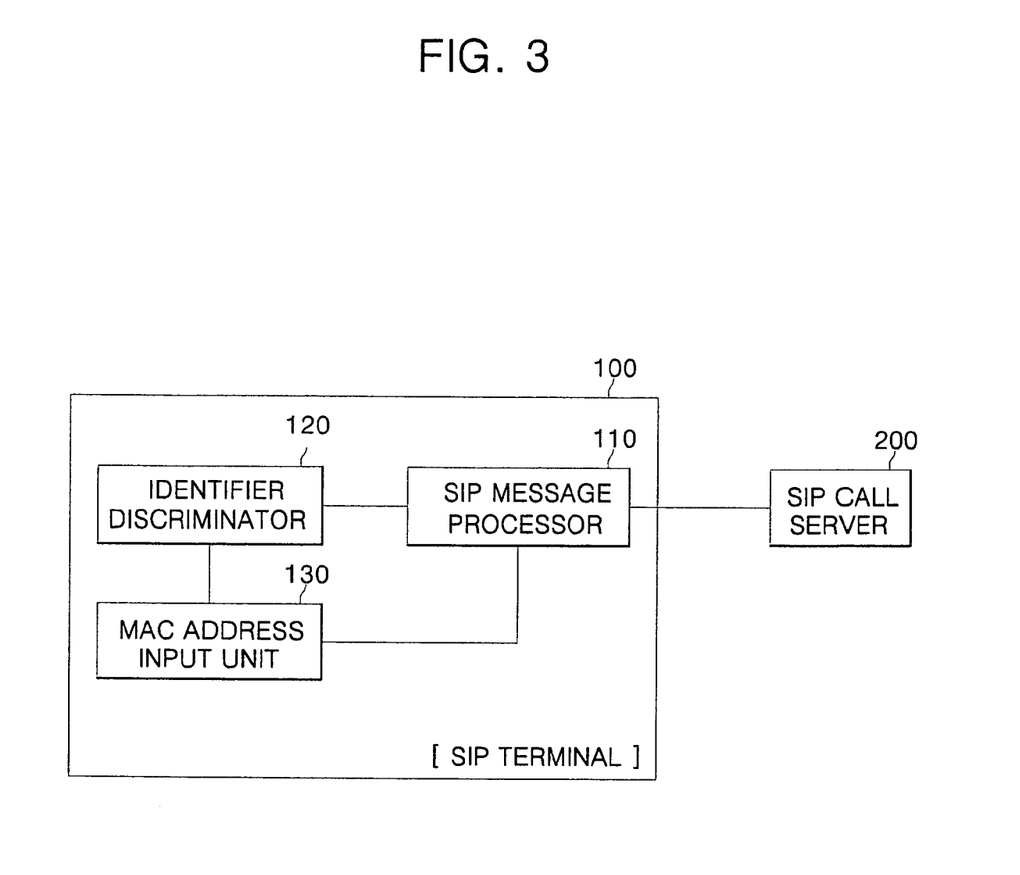
FIG. 3 is a block diagram of an SIP terminal in an SIP based VoIP system according to an embodiment of the present invention.

FIG. 3 is a block diagram of an SIP based VoIP system according to an embodiment of the present invention, in which the SIP terminal 100 of the SIP based VoIP system includes an SIP registration module including an SIP message processor 110, an identifier discriminator 120 and a MAC address input unit 130.

After having transmitted a first registration request message to the SIP call server 200, when the SIP registration module of the SIP terminal 100 receives a user information request message requesting the MAC address of the SIP terminal 100, the SIP registration module of the SIP terminal 100 transmits the MAC address of the SIP terminal 100 on a second registration message to the SIP call server 200 and then receives a response message, thereby completing the registration process for the SIP terminal 100.

The SIP message processor 110 in the SIP registration module of the SIP terminal 100 transmits the first and second registration request messages to the SIP call server 200, and receives the user information request message and the response message from the SIP call server 200.

The identifier discriminator 120 in the SIP registration module of the SIP terminal 100 determines whether or not the user information request message received from the SIP call server 200 includes an identifier that requests the MAC address of the SIP terminal 100. That is, the identifier discriminator 120 in the SIP module of the SIP terminal 100 determines whether or not an identifier exists in the nonce of the "WWW-Authenticate" field in the user information request message.

If an identifier exists in the user information request message, the MAC address input unit 130 in the SIP registration module of the SIP terminal 100 inputs its MAC address into the second registration request message. In this case, the second registration request message transmitted from the MAC address input unit 130 to the SIP call server 200 includes the MAC address in the user_name of the "Authorization" field.

First, the SIP message processor 110 in the SIP registration module of the SIP terminal 100 transmits a first registration request message to the SIP call server 200 as shown in FIG. 8A.

After that, the SIP message processor 110 in the SIP registration module of the SIP terminal 100 receives a user information request message from the SIP call server 200.

Then, the identifier discriminator 120 in the SIP registration module of the SIP terminal 100 determines whether or not an identifier "mac" requesting the MAC address of the SIP terminal 100 exists in the user information request message received from the SIP call server 200. That is, the identifier discriminator 120 in the SIP registration module of the SIP terminal 100 determines whether or not the identifier "mac" exists in the nonce of the "WWW-Authenticate" field in the user information request message.

If the identifier discriminator 120 in the SIP registration module of the SIP terminal 100 determines that the identifier "mac" requesting the MAC address of the SIP terminal 100 exists in the user information request message, then the MAC address input unit 130 in the SIP registration module of the SIP terminal 100 adds the MAC address "000447681 cdd" of the SIP terminal 100 into the "user_name" and adds the "UserA000447681cdd" into the second registration request message. In this case, the second registration message, which the MAC address input unit 130 in the SIP registration module of the SIP terminal transmits to the SIP call server 200, includes the MAC address of the SIP terminal 100 in the user_name of the "Authorization" field.

Then, the SIP message processor 110 in the SIP registration module of the SIP terminal 100 transmits the second registration request message including the MAC address of the SIP terminal 100 to the SIP call server 200.

After that, the SIP message processor 110 in the SIP registration module of the SIP terminal 100 receives a response message from the SIP call server 200 and thus completes an SIP registration process of the SIP terminal 100.

Figure 4:
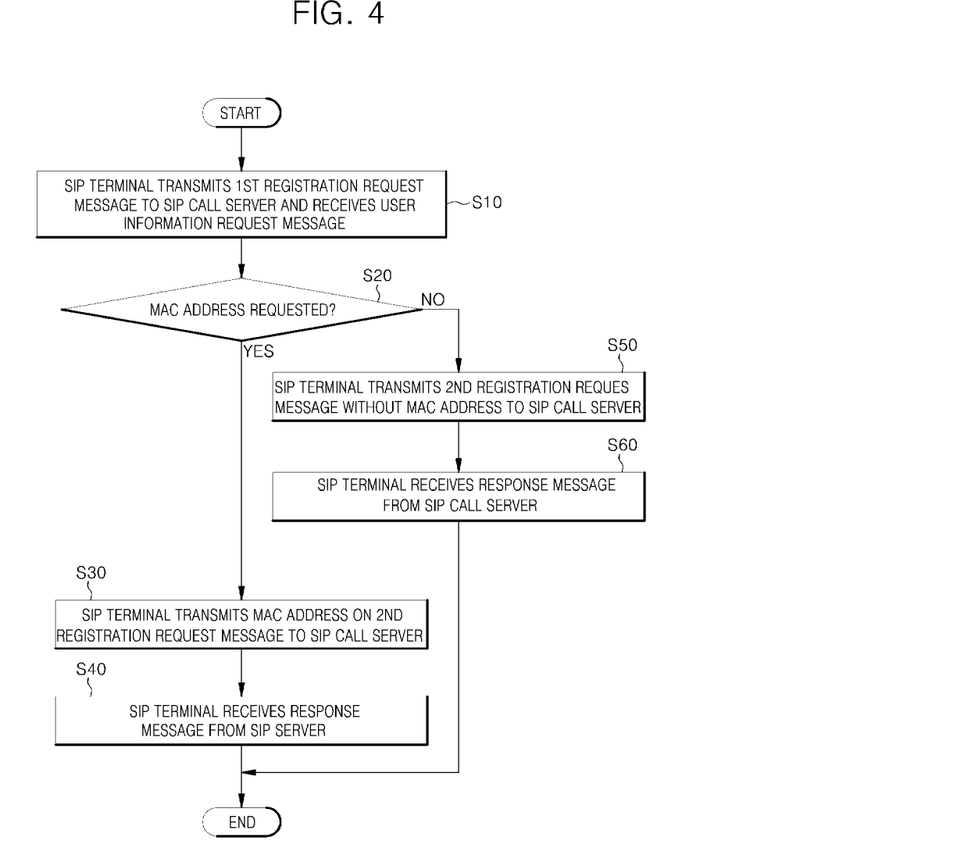
FIG. 4 is a flowchart of a method of registering an SIP terminal in an SIP based VoIP system according to an embodiment of the present invention.

A method of registering an SIP terminal in an SIP based VoIP system in accordance with an embodiment of the present invention having the above-described construction is described below with reference to FIG. 4.

First, the SIP terminal 100 transmits a first registration request message to the SIP call server 200 and then receives a user information request message in S10.

Then, in S20, the SIP terminal 100 determines whether or not the SIP call server 200 has requested the MAC address of the SIP terminal 100 based on the received user information request message. This is effected by determining whether or not an identifier exists in the nonce of the "WWW-Authenticate" field in the user information request message of the SIP terminal 100.

In this case, if it has been determined in S20 that the SIP call server 200 has requested the MAC address of the SIP terminal 100 (YES), then the SIP terminal 100 transmits user terminal information including the MAC address of the SIP terminal 100 on a second registration request message to the SIP call server 200 in S30.

Then, in S40, the SIP terminal 100 receives a response message from the SIP call server 200 and completes registration.

If it has been determined in S20 that the SIP call server 200 has not requested the MAC address of the SIP terminal 100 (NO), then the SIP terminal 100 transmits user terminal information without the MAC address of the SIP terminal 100 on a second registration request message to the SIP call server 200 in S50. In this case, the SIP terminal 100 adds the MAC address thereof in the user_name of the "Authorization" field.

Then, in S60, the SIP terminal 100 receives a response message from the SIP call server 200 and completes registration in S60.

Figure 5:
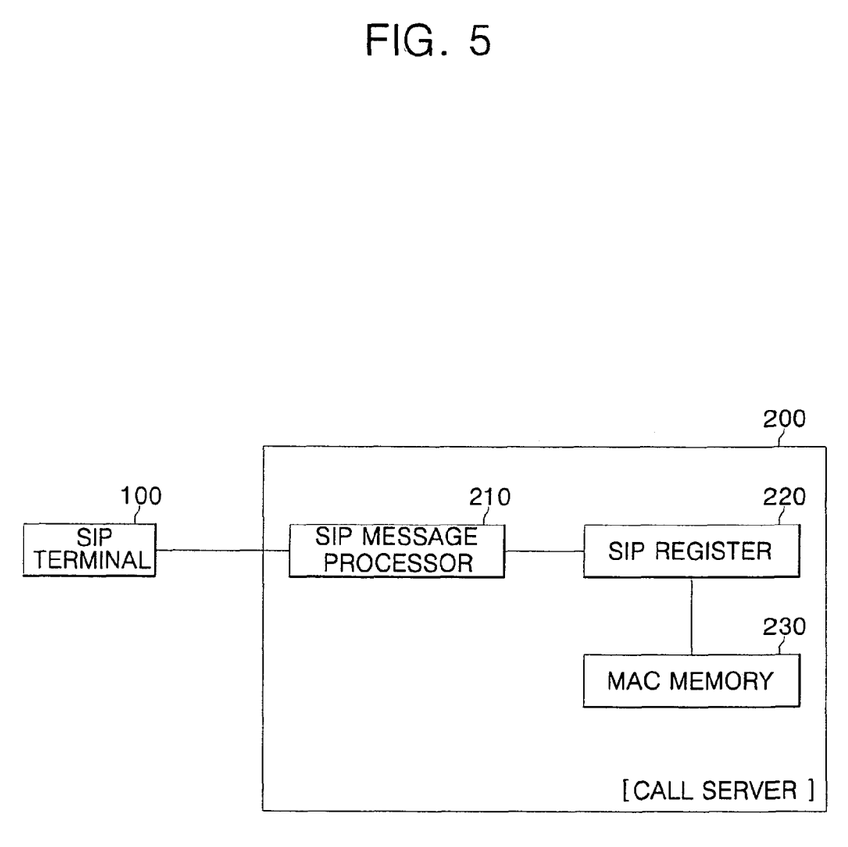
FIG. 5 is a block diagram of a method of registering an SIP call server in an SIP based VoIP system according to an embodiment of the present invention.

FIG. 5 is a block diagram of a method of registering an SIP terminal in an SIP based VoIP system according to an embodiment of the present invention. With reference to FIG. 5, an SIP call server 200 of the SIP based VoIP system has an SIP registration module including an SIP message processor 210, an SIP register 220, and a MAC memory 230.

The SIP registration module of the SIP server 200 receives a first registration request message from the SIP terminal 100 and then transmits a user information request message to the SIP terminal 100, requesting the MAC address of the SIP terminal 100, and upon receiving a second registration request message including the MAC address from the SIP terminal 100, registers the SIP terminal 100 while storing the MAC address to be matched to the registered SIP terminal 100 and then transmits a response message to the SIP terminal 100. In this case, the second registration request message received from the SIP terminal 100 includes the MAC address of the SIP terminal 100 in the user_name of the "Authorization" field, and the user information request message transmitted to the SIP terminal 100 includes an identifier in the nonce of the "WWW-Authenticate" field.

In this case, the SIP message processor 210 in the SIP registration module, upon receiving the first registration request message from the SIP terminal 100, transmits the user information request message requesting the MAC address to the SIP terminal 100, and upon receiving the second registration request message including the MAC address from the SIP terminal 100, extracts the user information and the MAC address of the SIP terminal 100, and if the SIP terminal 100 is authenticated, transmits the response message to the SIP terminal 100.

Furthermore, the SIP register 220 in the SIP registration module registers the SIP terminal 100 based on the user information of the SIP terminal 100 extracted from the SIP message processor 210.

In addition, the MAC memory 230 in the SIP registration module stores the MAC address to be matched to an authentication key of the SIP terminal 100 authenticated by an SIP authenticator.

First, the SIP message processor 210 in the SIP registration module of the SIP call server 200 receives a first registration request message as shown in FIG. 8A from the SIP terminal 100.

Figure 8B:
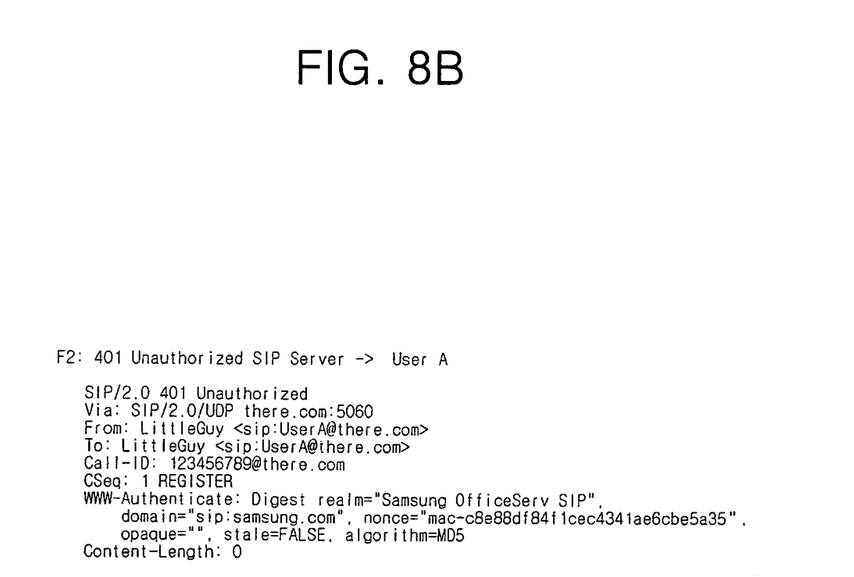
FIG. 8B is a user information request message that the SIP call server transmits to the SIP terminal in the SIP based VoIP system of any one of FIGS. 1 to 7.

In order for the SIP call server 200 to register the SIP terminal 100 together with MAC address of the SIP terminal 100, the SIP message processor 210 in the SIP registration module of the SIP call server 200 adds an identifier "mac" for requesting the MAC address as shown in FIG. 8B into a user information request message and transmits the user information request message to the SIP terminal 100. In this case, the identifier "mac" has to be added into the nonce of the "WWW-Authenticate" field in the user information request message, which the SIP call server 200 transmits, and has previously set in the SIP terminal 100.

Figure 8C:
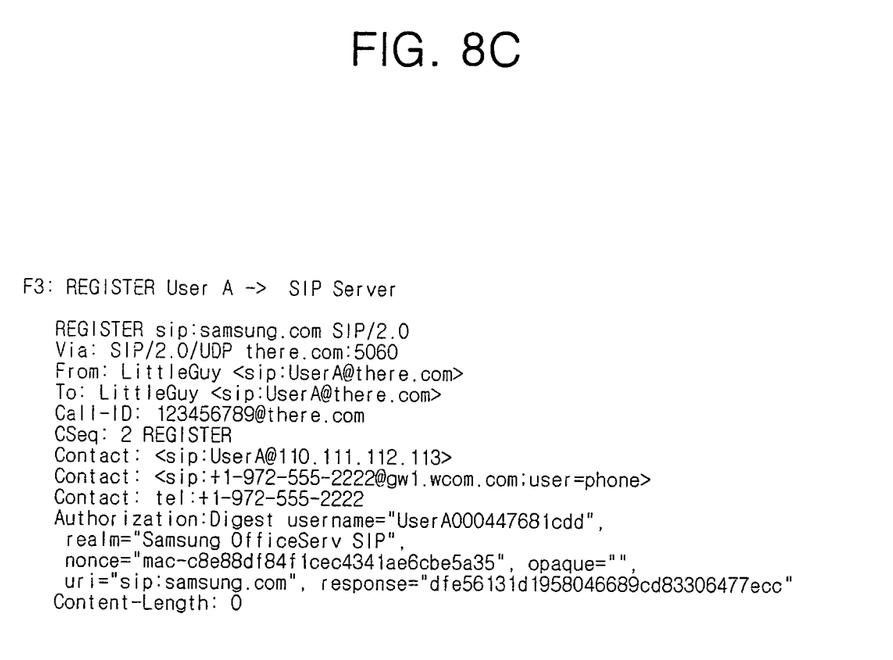
FIG. 8C is a second registration request message that the SIP terminal transmits to the SIP call server in the SIP based VoIP system of any one of FIGS. 1 to 7.

Then, the SIP message processor 210 in the SIP registration module of the SIP call server 200 receives a second registration request message including the MAC address "000447681cdd" as shown in FIG. 8C from the SIP terminal 100. In this case, the second registration request message received from the SIP terminal 100 includes the MAC address of the SIP terminal 100 in the user_name of the "Authorization" field.

Then, the SIP message processor 210 in the SIP registration module of the SIP call server 200 extracts the user information and the MAC address of the SIP terminal 100. In this case, the SIP message processor 210 can extract the MAC address by comparing user_name's in the first and second registration request message.

Then, the SIP registration processor 220 in the SIP registration module registers the SIP terminal 100 based on the user information of the SIP terminal 100 extracted from the SIP message processor 210.

Furthermore, the MAC memory 230 in the SIP registration module stores the MAC address to be matched to an authentication key of the SIP terminal 100 authenticated by the SIP authenticator.

Figure 8D:
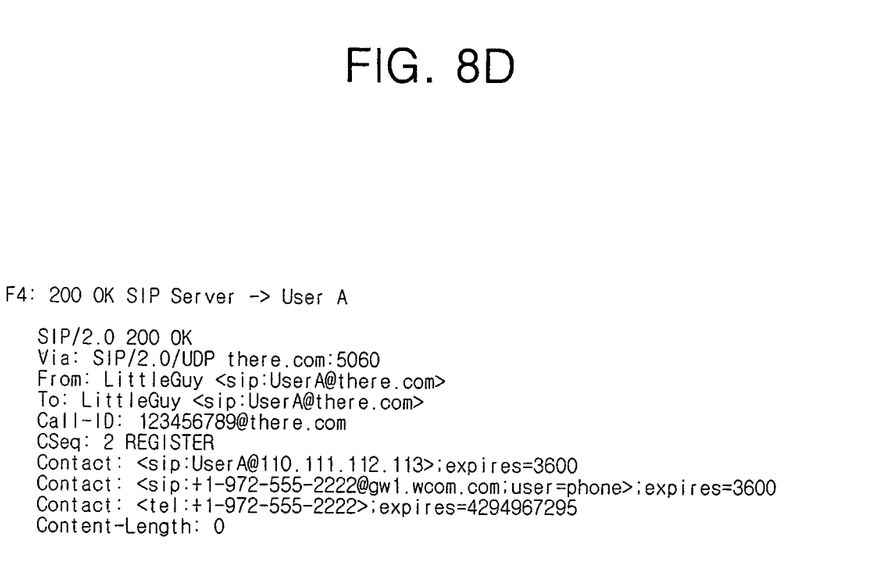
FIG. 8D is a response message that the SIP call server transmits to the SIP terminal in the SIP based VoIP system of one of FIGS. 1 to 7.

Then, the SIP message processor 210 in the SIP registration module of the SIP call server 200 transmits a response message as shown in FIG. 8D to the SIP terminal 100.

Figure 6:
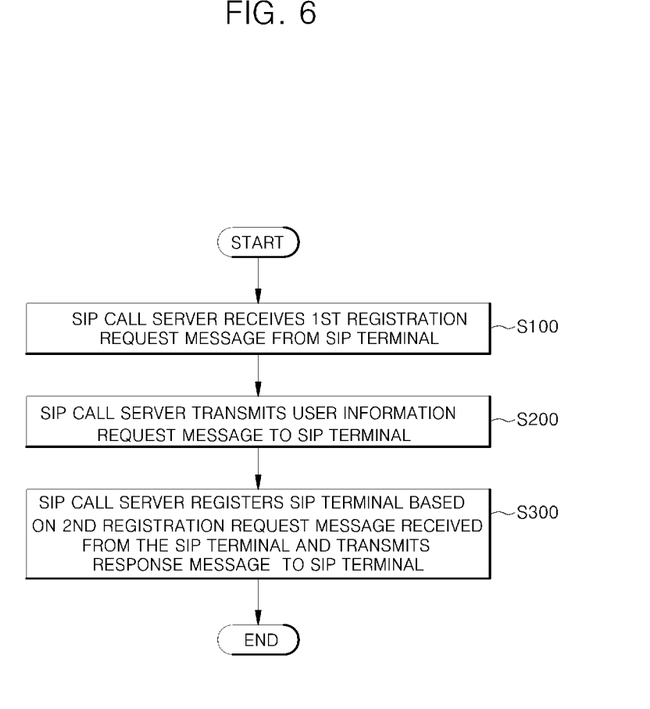
FIG. 6 is a flowchart of a method of registering an SIP terminal by an SIP call server in an SIP based VoIP system according to an embodiment of the present invention.

A method in which the SIP call server registers the SIP terminal in the SIP based VoIP system in accordance with an embodiment of the present invention having the above-described construction is described below with reference to FIG. 6.

First, the SIP call server 200 receives a first registration request message from the SIP terminal 100 in S100.

In S200, the SIP call server 200 transmits a user information request message to the SIP terminal 100, requesting the MAC address of the SIP terminal 100. In this case, in order for the SIP call server 200 to acquire the MAC address of the SIP terminal 100, the user information request message includes an identifier "mac" in the nonce of the "WWW-Authenticate" field.

Then, the SIP call server 200 registers the SIP terminal 100 based on the second registration request message received from the SIP terminal 100 while storing the MAC address to be matched to the registered SIP terminal 100, and then transmits a response message to the SIP terminal 100 in S300. In this case, the SIP call server 200 compares the user_name's of the "Authenticate" fields in the first and second registration request messages to confirm the MAC address of the SIP terminal 100.

Figure 7:
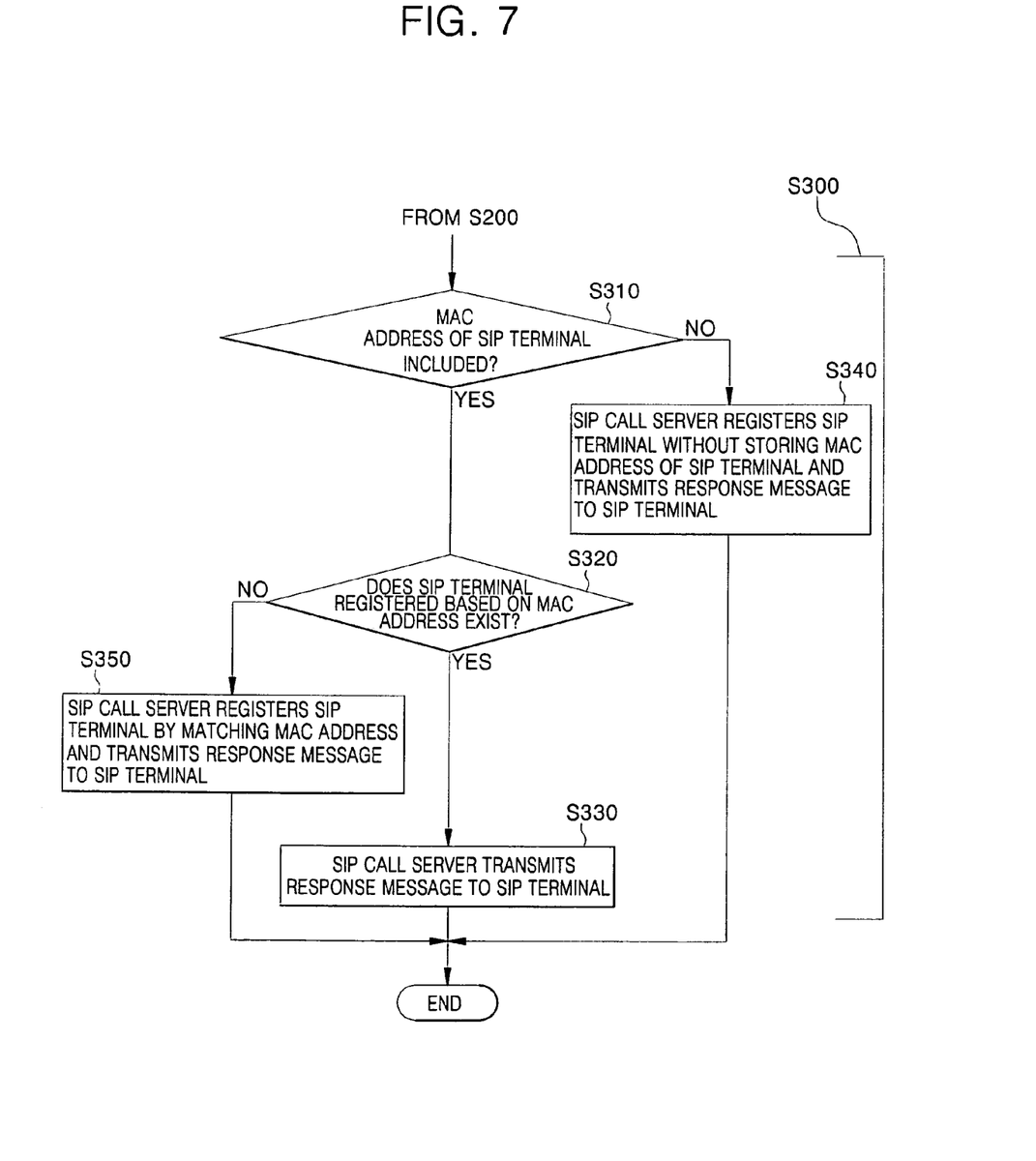
FIG. 7 is a detailed flowchart of the method of registering an SIP terminal by an SIP call server in an SIP based VoIP system according to the embodiment of the present invention of FIG. 6, including the steps of storing a MAC address to be matched to the SIP terminal.

The above-mentioned step S300 is described below in detail with reference to FIG. 7.

First, the SIP call server 200 determines whether or not the received second registration request message includes the MAC address of the SIP terminal 100 in S310.

If it has been determined in S310 that the MAC address of the SIP terminal 100 has been included in the second registration request message (YES), then the SIP call server 200 determines whether or not the registered SIP terminal 100 (or its authentication key) exists based on the MAC address in S320. That is, the SIP call server 200 can acquire "000447681 cdd" that is the MAC address of the SIP terminal 100 by comparing "UserA" that is "user_name" of the first registration request message with "UserA000447681 cdd" that is "user_name" of the second registration request message.

If it has been determined in S320 that the registered SIP terminal 100 exists (YES), then the SIP call server 200 transmits a response message to the SIP terminal 100 in S330.

If it has been determined in S310 that the MAC address of the SIP terminal 100 has not been stored in the second registration request message (NO), then the SIP call server 200 registers the SIP terminal 100 without storing the MAC address of the SIP terminal 100, and then transmits a response message to the SIP terminal 100 in S340.

On the other hand, if it has been determined in S320 that the registered SIP terminal 100 does not exist (NO), the SIP call server 200 executes registration by matching the MAC address of the SIP terminal 100 and then transmits a response message to the SIP terminal 100 in S350.

As described hereinbefore, the SIP based VoIP system and the method of registering an SIP terminal in the SIP based VoIP system of embodiments of the present invention can improve the registration authentication process for the SIP terminal in the VoIP system using a standard SIP so that the SIP server can effectively manage SIP terminals which are gradually increasing in number.

While the present invention has been shown and described in connection with the exemplary embodiments, it will be apparent to those skilled in the art that modifications and variations can be made without departing from the spirit and scope of the present invention as defined by the appended claims.

What is claimed is:

1. A Session Initiation Protocol (SIP)-based Voice over Internet Protocol (VoIP) system, comprising:
   a SIP call server and a SIP terminal;
   the SIP call server to transmit a user information request message to the SIP terminal to request a Media Access Control (MAC) address of the SIP terminal upon receipt of a first registration request message from the SIP terminal, to register the SIP terminal and store the MAC address to be matched to the registered SIP terminal upon receipt of a second registration request message comprising the MAC address from the SIP terminal, and to transmit a response message to the SIP terminal; and
   the SIP terminal, upon receipt of the user information request message after transmission of the first registration request message, to analyze the user information request message to determine whether the MAC address is requested, and to transmit the MAC address of the SIP terminal in the second registration request message to the SIP call server in response to a determination that the MAC address is actually requested.

2. The VoIP system according to claim 1, wherein the second registration request message is configured to add the MAC address of the SIP terminal to a user_name of an "Authorization" field.

3. The VoIP system according to claim 1, wherein the user information request message comprises an identifier in a nonce of a "WWW-Authenticate" field.

4. A Session Initiation Protocol (SIP) terminal of a SIP-based Voice over Internet Protocol (VoIP) system, the SIP terminal comprising:
   a SIP registration circuit to transmit a first registration request message to a SIP call server, to transmit a second registration request message comprising a Media Access Control (MAC) address of the SIP terminal to the SIP call server upon receipt of a user information request message and in response to a determination that the SIP call server requests the MAC address of the SIP terminal, and to receive a response message from the SIP call server to complete SIP terminal registration; and
   a memory to store the MAC address of the SIP terminal.

5. The SIP terminal according to claim 4, wherein the SIP registration circuit comprises:
   a SIP message processor to transmit the first registration request message and the second registration request message to the SIP call server and to receive the user information request message and the response message from the SIP call server;
   an identifier discriminator to determine whether the user information request message received from the SIP call server comprises an identifier requesting the MAC address of the SIP terminal; and
   a MAC address input unit circuit to add the MAC address of the SIP terminal to the second registration request message if the identifier exists in the user information request message.

6. The SIP terminal according to claim 4, wherein the second registration request message comprises the MAC address of the SIP terminal in a user_name of an "Authorization" field.

7. The SIP terminal according to claim 4, wherein the user information request message comprises an identifier in a nonce of a "WWW-Authenticate" field.

8. A Session Initiation Protocol (SIP) call server of a SIP-based Voice over Internet Protocol (VoIP) system, the SIP call server comprising:
   a SIP registration circuit to transmit a user information request message to a SIP terminal to request a Media Access Control (MAC) address of the SIP terminal upon receipt of a first registration message from the SIP terminal, to register the SIP terminal upon receipt of a second registration message comprising the MAC address of the SIP terminal from the SIP terminal, and to transmit a response message to the SIP terminal, the user information request message comprising an identifier to indicate whether the SIP call server requests the MAC address of the SIP terminal; and
   a memory to store the MAC address to be matched to the SIP terminal to be registered.

9. The SIP call server according to claim 8, wherein the SIP registration circuit comprises:
   a SIP message processor to transmit the user information request message to the SIP terminal upon receipt of the first registration message from the SIP terminal, to extract user information and the MAC address of the SIP terminal upon receipt of the second registration message comprising the MAC address, and to transmit the response message to the SIP terminal upon the SIP terminal being authenticated; and
   a SIP register to register the SIP terminal based on the user information of the SIP terminal extracted from the SIP message processor,
   wherein the memory is configured to store the MAC address to be matched to an authentication key of the SIP terminal upon authentication of the SIP terminal by the SIP register.

10. The SIP call server according to claim 8, wherein the second registration request message comprises the MAC address of the SIP terminal in a user_name of an "Authorization" field.

11. A method of registering a Session Initiation Protocol (SIP) terminal in a SIP-based Voice over Internet protocol (VoIP) system, the method comprising:
    transmitting a first registration request message to a SIP call server from the SIP terminal;
    transmitting a user information request message to the SIP terminal from the SIP call server, the user information request message comprising an identifier to indicate whether the SIP call server requests a Media Access Control (MAC) address of the SIP terminal;
    determining whether the MAC address is requested based on the user information request message;
    transmitting a second registration request message comprising the MAC address of the SIP terminal to the SIP call server from the SIP terminal in response to a determination that the MAC address is actually requested; and
    registering the SIP terminal based on the second registration request message and storing the MAC address to be matched to the registered SIP terminal in the SIP call server, and transmitting a response message to the SIP terminal.

12. The method according to claim 11, wherein the user information request message transmitted from the SIP call server to the SIP terminal comprises an identifier in a nonce of a "WWW-Authenticate" field to request the MAC address of the SIP terminal.

13. The method according to claim 11, wherein the second registration request message transmitted from the SIP terminal to the SIP call server comprises the MAC address of the SIP terminal in a user_name of an "Authorization" field.

14. A method of registering a Session Initiation Protocol (SIP) terminal in a SIP-based Voice over Internet protocol (VoIP) system, the method comprising:
  transmitting a first registration request message to a SIP call server and receiving a user information request message from the SIP call server;
  determining whether the SIP call server is requesting a Media Access Control (MAC) address of the SIP terminal based on the user information request message received from the SIP call server;
  transmitting user terminal information comprising the MAC address of the SIP terminal in a second registration request message to the SIP call server in response to a determination that the SIP call server has requested the MAC address of the SIP terminal; and
  receiving a response message from the SIP call server to complete registration.

15. The method according to claim 14, further comprising:
  transmitting user terminal information without the MAC address of the SIP terminal in the second registration request message to the SIP call server upon a determination that the SIP call server has not requested the MAC address of the SIP terminal; and
  receiving the response message from the SIP call server to complete registration.

16. The method according to claim 14, wherein determining whether the SIP call server has requested the MAC address of the SIP terminal comprises determining whether an identifier is included in a nonce of a "WWW-Authenticate" field in the received user information request message.

17. A method of registering a Session Initiation Protocol (SIP) terminal by a SIP call server in a SIP-based Voice over Internet Protocol (VoIP) system, the method comprising:
  receiving a first registration request message from the SIP terminal;
  transmitting a user information request message to the SIP terminal, the user information request message comprising an identifier to indicate whether the SIP call server requests a Media Access Control (MAC) address of the SIP terminal; and
  registering the SIP terminal based on a second registration request message received from the SIP terminal, storing the MAC address to be matched to the registered SIP terminal if the second registration request message comprises the MAC address of the SIP terminal, and transmitting a response message to the SIP terminal.

18. The method according to claim 17, wherein transmitting a response message to the SIP terminal comprises:
  determining whether the MAC address of the SIP terminal is included in the second registration request message received from the SIP terminal;
  determining whether the registered SIP terminal exists based on the MAC address of the SIP terminal being included in the second registration request message; and
  transmitting the response message to the SIP terminal upon a determination that the registered SIP terminal exists.

19. The method according to claim 18, further comprising registering the SIP terminal without storing the MAC address of the SIP terminal upon a determination that the MAC address has not been included in the second registration request message, and transmitting the response message to the SIP terminal.

20. The method according to claim 18, further comprising conducting registration by matching of the MAC address of the SIP terminal upon a determination that the registered SIP terminal does not exist, and transmitting the response message to the SIP terminal.

* * * * *